United States Patent [19]

Okano

[11] Patent Number: 4,861,047
[45] Date of Patent: Aug. 29, 1989

[54] METAL PLATE WITH REINFORCED BEADS FOR A METAL GASKET

[75] Inventor: Takashi Okano, Tokyo, Japan

[73] Assignee: Ishikawa Gasket Co., Ltd., Tokyo, Japan

[21] Appl. No.: 280,394

[22] Filed: Dec. 5, 1988

[30] Foreign Application Priority Data

Dec. 3, 1987 [JP] Japan ............................ 62-184474[U]

[51] Int. Cl.$^4$ .............................................. F16J 15/08
[52] U.S. Cl. .................. 277/235 B; 277/234; 277/236
[58] Field of Search ................... 277/207 R, 213, 215, 277/232–234, 235 R, 235 B, 236

[56] References Cited

U.S. PATENT DOCUMENTS

| | | | |
|---|---|---|---|
| 1,904,651 | 4/1933 | Victor | 277/232 X |
| 2,055,103 | 9/1936 | Hewitt | 277/233 X |
| 2,114,442 | 4/1938 | Fitzgerald | 277/235 B X |
| 2,125,334 | 8/1938 | Dempsey | 277/233 X |

FOREIGN PATENT DOCUMENTS 1445440  5/1966  France ............................ 277/235 B

*Primary Examiner*—Robert S. Ward
*Attorney, Agent, or Firm*—Kanesaka and Takeuchi

[57] ABSTRACT

A metal plate used for a metal gasket. The metal plate is provided with a plurality of beads around portions to be sealed. The beads intersect with each other and include at least one intersecting portion. At least one depression is formed at the intersecting portion. As a result, when the beads are compressed, the intersecting portion can provide surface pressure at least substantially equal to the portions of the beads other than the intersecting portion.

11 Claims, 2 Drawing Sheets

METAL PLATE WITH REINFORCED BEADS FOR A METAL GASKET

BACKGROUND OF THE INVENTION AND RELATED ART STATEMENT

The present invention relates to a metal plate having reinforced beads for a metal gasket.

An internal combustion engine is provided with a plurality of holes therein, such as cylinder holes, water holes, oil holes, push rod holes, and so on. Some of the holes must be securely sealed therearound to prevent fluid from leaking from the holes. Therefore, a gasket to be installed between two engine blocks must have good sealing ability around the holes of the engine.

A steel laminate gasket is formed of a plurality of steel plates. In order to securely seal around the holes of the engine, it is conventional that at least one of the metal plates of a steel laminate gasket is provided with beads around portions to be sealed. When the steel laminate gasket is tightened, the beads are compressed to provide surface pressure thereat. A steel laminate gasket with beads as stated above operates fine as intended.

In a steel laminate gasket, sometimes, areas to be sealed are located very close to each other. In this situation, it is impossible to separately or independently form beads, so that adjacent beads are combined and a common portion of the beads is deleted. In some situation, also, one side of a sealing area is sealed by one bead, while the other sides are sealed by two beads, wherein two beads extend from one bead. Namely, in some situations, beads intersect with each other and an intersecting portion is formed.

When two beads intersect, an area of the intersecting portion of the two beads becomes large. Namely, a wide bead portion is formed at the intersecting portion. Therefore, when the steel plate with the intersecting portion of the beads is compressed, the intersecting portion of the beads shows a surface pressure weaker than the rest of the beads. When high pressure is applied, it is liable to leak at a weak surface pressure portion. As a result, a steel laminate gasket having a steel plate with an intersecting portion of the beads is not suitable for an engine requiring high sealing pressure.

Similarly, in case a metal gasket is formed of one metal plate, which is provided with an intersecting portion of beads, the intersecting portion becomes large. As a result, when the metal plate is compressed, the surface pressure at the intersecting portion of the beads becomes weaker than that at the rest of the beads. The metal gasket is, therefore, liable to cause leakage.

Accordingly, one object of the present invention is to provide a metal plate with beads for a metal gasket, which can provide high surface pressure throughout the entire bead, when compressed.

Another object of the present invention is to provide a metal plate as stated above, in which an intersecting portion of the beads has strength substantially equal to or stronger than the rest of the beads.

A further object of the present invention is to provide a metal plate as stated above, which can be used as one of metal plates of a steel laminate gasket.

Further objects and advantages of the invention will be apparent from the following description of the invention.

SUMMARY OF THE INVENTION

A metal plate of the present invention is used for a metal gasket to be installed between two engine blocks of an internal combustion engine. The metal plate of the invention may be used as one of metal plates of a steel laminate gasket.

The metal plate is provided with a plurality of beads around portions to be sealed, wherein at least two beads intersect with each other to thereby form one intersecting portion. In the present invention, at least one depression is formed at the intersecting portion of the beads.

Namely, when a plurality of beads intersects and forms an intersecting portion, the size of the intersecting portion becomes relatively large. When comparing the intersecting portion and other portions of the beads, the intersecting portion is not supported at a relatively wide area. When the beads are compressed equally, therefore, the intersecting portion can only provide weak surface pressure.

In the present invention, the depression is formed in the intersecting portion, so that the stiffness at the intersecting portion is strengthened because the depression is not deformed easily. As a result, when the beads are compressed, the intersecting portion of the beads can provide sealing pressure substantially equal to other portions of the beads. As long as the intersecting portion has flexibility, the intersecting portion of the beads may provide sealing pressure stronger than other portions of the beads.

The depression is formed at a portion where force applied to the beads when the metal plate is compressed is equally distributed on the beads. The height of the depression is less than the height of the bead.

A plurality of depressions may be formed at one intersecting portion. Also, the depression may have a form of an elongated slot.

DETAILED DESCRIPTION OF PREFERRED EMBODIMENTS

Figure 1:
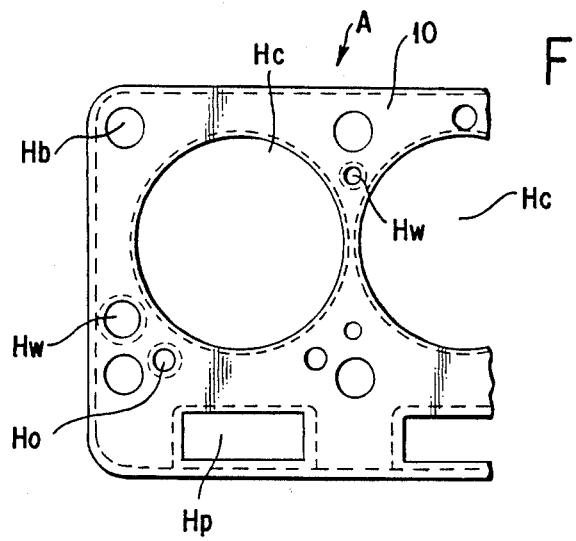
FIG. 1 is a partial plan view of a first embodiment of a metal plate in accordance with the present invention.
Figure 2:
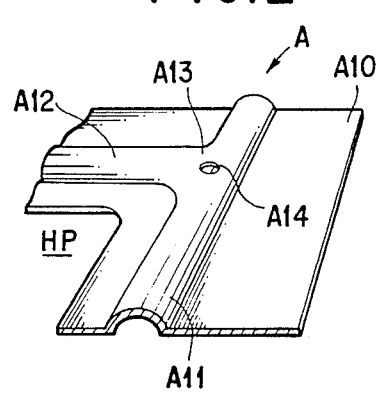
FIG. 2 is an enlarged perspective section view of a part of the metal plate in FIG. 1.

Referring to FIGS. 1 and 2, a first embodiment A of a steel plate in accordance with the present invention is shown. The steel plate A is provided with cylinder holes Hc, water holes Hw, oil holes Ho, bolt holes Hb and push rod holes Hp. Beads are formed around the cylinder holes Hc, water holes Hw, oil holes Ho and push rod holes Hp. Also, an outer bead is formed adjacent to the outer periphery of the steel plate. In FIG. 1, the beads are indicated in dot lines.

As shown in FIGS. 1 and 2, a space between the push rod hole Hp and an outer periphery of a plate A10 is narrow. Therefore, an outer bead A11 extending along the outer periphery of the plate A10 is formed between the push rod hole Hp and the outer periphery of the plate A10, from which a bead A12 surrounding the push rod hole Hp extends. An intersecting portion A13 is formed at a portion where the beads A11, A12 intersect.

Figures 4A, 4B, 4C:
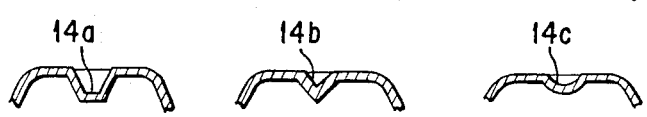
FIGS. 4(A)-4(C) are section views for showing different shapes of the depressions of the present invention.

In the center of the intersecting portion A13, a depression A14 having a shape as shown in FIG. 4(A) is formed. The depression A14 is formed to improve flexibility of the beads at the intersecting portion A13. Practically, the depression A14 is formed in the center of the intersecting portion A13 so that the stiffness or strength of the intersecting portion A13 changes and becomes substantially the same as that of the beads A11, A12 outside the intersecting portion A13. Therefore, when the plate A10 is compressed, the beads A11, A12 and the intersecting portion A13 can provide an equal surface pressure.

It is important that the depression A14 is formed at a portion where the force applied to the intersecting portion A13 is equally distributed throughout the intersecting portion A10 when the plate A10 is compressed. Generally, the depression A14 is formed in the center of the intersecting portion A13. However, the depression A14 may be formed at some other position, as will be explained hereinafter.

The intersecting portion A13 with the depression A14 provides surface pressure substantially equal to the surface pressure at other portions of the beads A11, A12 when the plate A10 is compressed. However, the intersecting portion A13 may provide surface pressure stronger than that at other portions of the beads A11, A12 as long as the intersecting portion A13 has flexibility or elasticity.

Namely, even if the intersecting portion A13 is stronger in rigidity than other portions of the beads A11, A12, very strong tightening pressure is applied to the entire beads A11, A12 including the intersecting portion A13 when the engine blocks are tightened. In this situation, the intersecting portion A13 as well as other portions of the beads A11, A12 are compressed equally at high pressure, though the surface pressure at the beads is not even. The tightening pressure is determined based on the compression force applied to the beads A11, A12, not the intersecting portion of the beads. Therefore, even if the intersecting portion provides strong surface pressure, it does not affect the sealing ability of the beads.

The intersecting portion must provide surface pressure substantially equal to or stronger than the surface pressure of the beads other than the intersecting portion. Otherwise, when high pressure is applied to the beads, leakage may occur at a weak surface pressure portion.

The height of the depression A14 is less than the height of the beads A11, A12. The height and size of the depression A14 are determined based on the size of the beads A11, A12.

When a steel laminate gasket is formed, the plate A10 and at least one other metal plate having holes similar to the plate A10 are piled together. When the gasket thus formed is compressed, the beads A11, A12 and the intersecting portion A13 can provide an equal surface pressure. As a result, the steel laminate gasket having the plate A10 can securely seal around the sealing portions.

Figure 3:
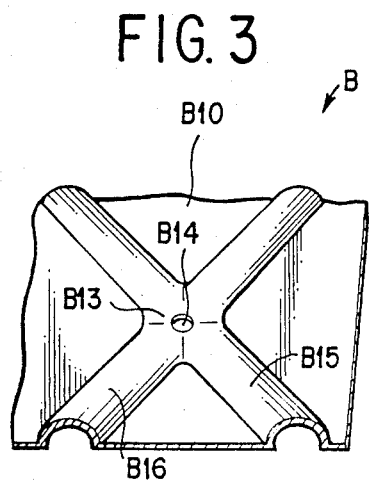
FIG. 3 is a perspective section view, similar to FIG. 2, of a second embodiment of a metal plate of the present invention.

FIG. 3 shows a second embodiment B of the steel plate of the present invention. In the steel plate B, beads B15, B16 are formed on a metal plate B10 to completely intersect or cross over each other. A depression B14 is formed in the center of an intersecting portion B13 of the beads B15, B16. In the steel plate B, an equal surface pressure is obtained as in the steel plate A.

FIGS. 4(A)-4(C) show modifications of the shapes of the depressions formed at the intersecting portion of the beads. In FIG. 4(A), a depression 14a has a cup shape, as used in the steel plates A, B. The depression 14a is suitable when an intersecting portion is relatively wide.

In FIG. 4(B), a depression 14b is tapered downwardly, which is suitable when an intersecting portion is relatively narrow. A depression may be formed to slightly dent or curve, as shown at 14c in FIG. 4(C).

The plane shape of the depression is not important. The depression may have any plane shape, such as rectangular, triangular and oval.

Figure 5A:
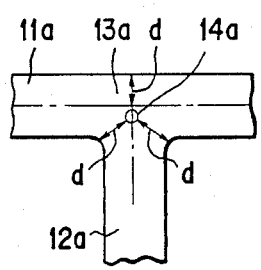
FIGS. 5(A)-5(C) are explanatory plan views for showing different embodiments of the invention.
Figure 5B:
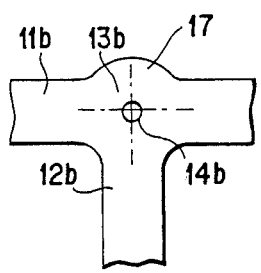
Figure 5C:
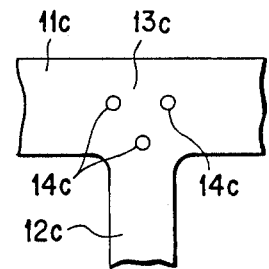

FIGS. 5(A)-5(C) show the variation of the location of the depressions in case two beads intersect in T-shape. In the embodiment as shown in FIG. 5(A), beads 11a, 12a intersect to form an intersecting portion 13a, and a depression 14a is formed so that the distances d from the depression 14a to the nearest three edges of the beads 11a, 12a are equal.

In the embodiment as shown in FIG. 5(B), beads 11b, 12b intersect to form a intersecting portion 13b, and the depression 14b is located where center lines of the two beads 11b, 12b intersect. In this case, a part 17 of the bead 11b may be expanded laterally so that the depression 14b is located in the center of the intersecting portion 13b.

In FIG. 5(C), a wide bead 11c intersects a narrow bead 12c. In an intersecting portion 13c, three small depressions 14c are formed to equally space apart from each other.

Figure 6A:
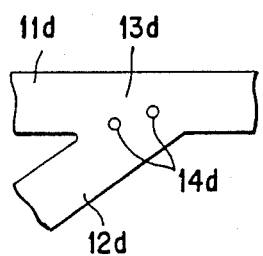
FIGS. 6(A)-6(C) are explanatory plan views for showing still different embodiments of the invention.
Figure 6B:
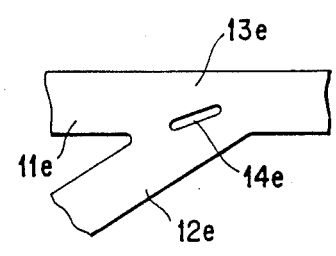
Figure 6C:
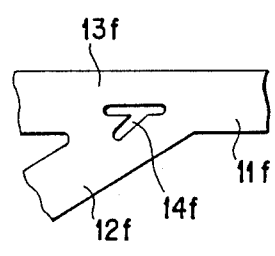

FIGS. 6(A)-6(C) show the variation of the location of the depressions in case two beads intersect in acute angles. In the embodiment as shown in FIG. 6(A), beads 11d, 12d intersect to form an intersection portion 13d, in which two depressions 14d are formed.

In the embodiment as shown in FIG. 6(B), an elongated depression 14e is formed at an intersecting portion 13e of two beads 11e, 12e. In FIG. 6(C), an intersecting portion 13f of two beads 11f, 12f is provided with an elongated depression 14f, which has a shape such that two elongated depressions extending along the respective beads 11f, 12f are combined together.

In a metal plate for a metal gasket, in case the metal plate is provided with an intersecting portion of two beads, the metal plate can not provide an equal surface pressure when the gasket is compressed, because flexibility or rigidity at the intersecting portion is different from that of the beads. In the present invention, at least one depression is formed at the intersecting portion of the beads so that the rigidity at the intersection portion and the beads becomes substantially the same. As a result, an equal surface pressure is obtained throughout the beads when compressed.

While the invention has been explained with reference to the specific embodiments of the invention, the explanation is illustrative and the invention is limited only by the appended claims.

What is claimed is:

1. A metal plate for a metal gasket, comprising:
   a metal plate,
   a plurality of beads formed on the metal plate around portions to be sealed, said beads intersecting with each other and having at least one intersecting portion; and at least one depression formed on the bead at the intersecting portion so that the intersecting portion of the beads can provide surface pressure at least substantially equal to the portions of the beads other than the intersecting portion when the beads are compressed.

2. A metal plate according to claim 1, wherein the depression is formed at a portion where force applied to the beads when the metal plate is compressed is equally distributed on the beads.

3. A metal plate according to claim 2, wherein the height of the depression is less than the height of the bead.

4. A metal plate according to claim 3, wherein the bottom of the depression has a flat portion.

5. A metal plate according to claim 3, wherein the depression is tapered downwardly.

6. A metal plate according to claim 3, wherein the depression is curved downwardly.

7. A metal plate according to claim 3, wherein the depression is formed in the center of the intersecting portion.

8. A metal plate according to claim 3, wherein the depression is formed at a position where central lines of the two beads intersect.

9. A metal plate according to claim 3, wherein a plurality of depressions is symmetrically arranged at the intersecting portion.

10. A metal plate according to claim 3, wherein the depression is an elongated slot.

11. A metal plate according to claim 10, wherein a plurality of elongated slots is formed to intersect with each other.

* * * * *